(12) United States Patent
Han et al.

(10) Patent No.: US 11,294,822 B2
(45) Date of Patent: Apr. 5, 2022

(54) NON-VOLATILE MEMORY STORAGE, COMPUTING SYSTEM INCLUDING THE SAME AND OPERATION METHOD THEREOF

(71) Applicant: RESEARCH & BUSINESS FOUNDATION SUNGKYUNKWAN UNIVERSITY, Suwon-si (KR)

(72) Inventors: Tae Hee Han, Seoul (KR); Jeong Beom Hong, Suwon-si (KR); Yong Wook Kim, Seoul (KR); Min Gu Kang, Ansan-si (KR); Jo Eun Lee, Bucheon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

(21) Appl. No.: 17/122,255

(22) Filed: Dec. 15, 2020

(65) Prior Publication Data
US 2021/0216466 A1 Jul. 15, 2021

(30) Foreign Application Priority Data
Jan. 9, 2020 (KR) .................. 10-2020-0003129

(51) Int. Cl.
*G06F 12/00* (2006.01)
*G06F 13/00* (2006.01)
*G06F 13/28* (2006.01)
*G06F 12/0893* (2016.01)

(52) U.S. Cl.
CPC .. *G06F 12/0893* (2013.01); *G06F 2212/1041* (2013.01); *G06F 2212/608* (2013.01)

(58) Field of Classification Search
CPC ............. G06F 12/0893; G06F 16/1815; G06F 16/1805

USPC ........................................................ 711/141
See application file for complete search history.

(56) References Cited

U.S. PATENT DOCUMENTS

| | | | | |
|---|---|---|---|---|
| 2005/0091448 | A1* | 4/2005 | Nakatani | G06F 11/2064 711/113 |
| 2014/0310499 | A1* | 10/2014 | Sundararaman | G06F 16/2308 711/203 |
| 2015/0295681 | A1* | 10/2015 | Liang | H04J 4/00 370/280 |

FOREIGN PATENT DOCUMENTS

| | | |
|---|---|---|
| KR | 10-0812710 B1 | 3/2008 |
| KR | 10-1541532 B1 | 8/2015 |
| KR | 10-2017-0098900 A | 8/2017 |

OTHER PUBLICATIONS

Korean Office Action dated Sep. 27, 2021 in corresponding Korean Patent Application No. 10-2020-0003129 (6 pages in Korean).

* cited by examiner

*Primary Examiner* — Edward J Dudek, Jr.
*Assistant Examiner* — Sidney Li
(74) *Attorney, Agent, or Firm* — NSIP Law (57) ABSTRACT

Disclosed is a method of operating a non-volatile memory device. A method of operating a non-volatile memory device according to an embodiment of the present disclosure, in a method of operating a non-volatile memory device including a log storage area, a data storage area, and an ACK generation unit, may include receiving a log and data from a cache memory, storing the received log in the log storage area, storing the received data in the data storage area, and transmitting an ACK signal to the cache memory according to a result of storing the log and the data.

18 Claims, 8 Drawing Sheets

| Flag Bit | Description | Action |
|---|---|---|
| 11 | Success of storing(or writing) both log and data | – |
| 10 | Success of storing log / Failure of storing data | Updating only log in next operation. |
| 01 | Failure of storing log / Success of storing data | Modifying data based on stored log in next operation |
| 00 | Failure of storing(or writing) both log and data | Transmitting ACK signal to cache memory |

NON-VOLATILE MEMORY STORAGE, COMPUTING SYSTEM INCLUDING THE SAME AND OPERATION METHOD THEREOF

CROSS-REFERENCE TO RELATED APPLICATION

This application is based on and claims priority under 35 U.S.C. 119 to Korean Patent Application No. 10-2020-0003129, filed on Jan. 9, 2020, the contents of which are all hereby incorporated by reference herein in their entirety.

BACKGROUND OF THE INVENTION

Field

The present disclosure relates to a non-volatile memory device, a computing system including the same, and a method of operating the same. In detail, it relates to a non-volatile memory device including a memory cell allocated to store a log and an ACK generation unit, a computing system including the non-volatile memory device, and a method of operating the non-volatile memory device transmitting an ACK signal for requesting retransmission of a log and data to a cache memory in case of failure of storing the log and data.

Description of Related Art

Next-generation non-volatile memory devices are attracting attention as a solution to replace a DRAM-based main memory having process scale limitations and large standby power. Non-volatile RAM (NVRAM) can significantly reduce power consumption compared to DRAMs that require a refresh operation, but rather, there was a problem in that data consistency and security problems occur.

Conventionally, TC method and Kiln method were used in order to solve this problem. The TC method uses a Transaction Cache-based architecture, and has a separate Transaction Cache between a core and a main memory. However, this is not suitable for current computing systems using multiple cores because the size of the Transaction Cache must be increased in proportion to the number of the cores.

In addition, the Kiln method is to add a log storage area in the cache of the last level, and since the log storage area added in the cache must be flushed every write operation, system performance may be degraded.

Therefore, there is a need for a new solution for solving data consistency and security problems.

SUMMARY

The present disclosure aims to maintain data consistency of a non-volatile memory device.

In addition, the present disclosure aims to reduce the amount of bus transactions added to maintain data consistency of a non-volatile memory device.

In addition, the present disclosure aims to improve the performance of the entire computing system and increase the lifetime of the memory bus by reducing the amount of bus transactions added to maintain data consistency of the non-volatile memory device.

Technical problems to be achieved by the present disclosure are not limited to the aforementioned technical problems, and other technical problems not described above may be evidently understood by those of ordinary skill in the art to which the present disclosure belongs from the following description.

In order to solve the above-described problem, the present disclosure, in a method of operating a non-volatile memory device including a log storage area, a data storage area, and an ACK generation unit, may include receiving a log and data from a cache memory, storing the received log in the log storage area, storing the received data in the data storage area, and transmitting an ACK signal to the cache memory according to a result of storing the log and the data.

In addition, the receiving the log and data may be receiving simultaneously the log and the data from the cache memory.

In addition, the ACK signal may include a first ACK signal indicating that operation of the non-volatile memory device is completed or a second ACK signal requesting retransmission of the log and the data to the cache memory.

In addition, the transmitting the ACK signal may be transmitting a flag bit from the log storage area and the data storage area to the ACK generation unit, and transmitting the ACK signal from the ACK generation unit to the cache memory based on the flag bit.

In addition, the flag bit may include a first flag bit indicating success or failure of storing the log in the log storage area and a second flag bit indicating success or failure of storing the data in the data storage area.

In addition, the flag bit may be any one of a first signal indicating success of storing the log and the data, a second signal indicating success of storing the log and failure of storing the data, a third signal indicating failure of storing the log and success of storing the data, and a fourth signal indicating failure of storing the log and the data.

In this case, the transmitting the ACK signal may be transmitting the ACK signal from the ACK generation unit to the cache memory when the fourth signal is transmitted from the log storage area and the data storage area to the ACK generation unit.

In this case, the ACK signal may include a command to retransmit the log and the data.

In addition, in order to solve the above-described problem, the present disclosure may include a log storage area configured to store a log received from a cache memory, a data storage area configured to store data received from the cache memory, and an ACK generation unit configured to receive a flag bit from the log storage area and the data storage area and transmit an ACK signal to the cache memory according to the flag bit.

In addition, the log storage area and the data storage area may receive simultaneously the log and the data from the cache memory.

In addition, the flag bit may include a first flag bit indicating success or failure of storing the log in the log storage area and a second flag bit indicating success or failure of storing the data in the data storage area.

The flag bit may be any one of a first signal indicating success of storing the log and the data, a second signal indicating success of storing the log and failure of storing the data, a third signal indicating failure of storing the log and success of storing the data, and a fourth signal indicating failure of storing the log and the data.

In this case, the flag bit may be the fourth signal, the ACK generation unit may receive the fourth signal, and the ACK generation unit may transmit the ACK signal to the cache memory.

In addition, the ACK signal may include a command to retransmit the log to the log storage area, and retransmit the data to the data storage area.

In addition, the ACK generation unit may include a NOR gate.

In addition, the non-volatile memory device may include a plurality of memory banks including a plurality of memory cells, and the plurality of memory banks may include the log storage area for each memory bank.

In addition, in order to solve the above-described problem, the present disclosure may include the above-described non-volatile memory device and a cache memory configured to transmit a log and data to the non-volatile memory device.

In this case, after transmitting the log and data, the cache memory may temporarily store the transmitted log and data.

In this case, the cache memory may receive an ACK signal from the non-volatile memory device, and retransmit the temporarily stored log and data to the non-volatile memory device based on the ACK signal.

The present disclosure has an effect of maintaining data consistency of a non-volatile memory device.

In addition, the present disclosure has an effect of reducing the amount of bus transactions added to maintain data consistency of a non-volatile memory device.

In addition, the present disclosure has an effect of improving the performance of the entire computing system and increasing the lifetime of the memory bus by reducing the amount of bus transactions added to maintain data consistency of the non-volatile memory device.

The effects obtained in the present disclosure are not limited to the above-mentioned effects, and other effects not mentioned will be clearly understood by those of ordinary skill in the art to which the present disclosure belongs from the following description.

BRIEF DESCRIPTION OF DRAWINGS

The accompanying drawings, which are included as a part of the description to help understanding the present disclosure, provide embodiments of the present disclosure and describe the technical features of the present disclosure with the description.

DETAILED DESCRIPTION

Hereinafter, embodiments disclosed in the present disclosure will be described in detail with reference to the accompanying drawings, but the same or similar elements are denoted by the same reference numerals regardless of the reference numerals, and redundant descriptions thereof will be omitted. The suffixes "module" and "unit" of elements used in the following description are given or used interchangeably in consideration of only the ease of writing the specification, and do not themselves have a distinct meanings or roles. In addition, in describing the embodiments disclosed in the present disclosure, when it is determined that a detailed description of related known technologies may obscure the subject matter of the embodiments disclosed in the present disclosure, the detailed description thereof will be omitted. In addition, the accompanying drawings are for easy understanding of the embodiments disclosed in the present disclosure, the technical spirit disclosed in the present disclosure is not limited by the accompanying drawings, and are to be understood as including all modifications, equivalents, and alternatives included in the spirit and scope of the present disclosure.

While terms, such as "first", "second", etc., may be used to describe various elements, the elements are not limited by the above terms. The above terms are used only for the purpose of distinguishing one element from another element.

When an element is referred to as being "coupled" or "connected" to another element, it should be understood that other element may exist in the middle although the element may be directly coupled or connected to the other element. On the other hand, when an element is referred to as being "directly coupled" or "directly connected" to another element, it should be understood that there is no other element in the middle.

Expressions in the singular include plural expressions unless the context clearly indicates otherwise.

In the present disclosure, it should be understood that terms such as "comprises" or "have" are intended to designate the presence of features, numbers, steps, operations, elements, parts, or combinations thereof described in the specification, but do not preclude the possibility of the presence or addition of one or more other features, numbers, steps, operations, elements, parts, or combinations thereof.

Hereinafter, a method of operating a non-volatile memory device according to a first preferred embodiment of the present disclosure will be described in detail based on the above-described contents. In addition, the performing entity of the operating method according to a first preferred embodiment of the present disclosure may be the non-volatile memory device.

Figure 1:
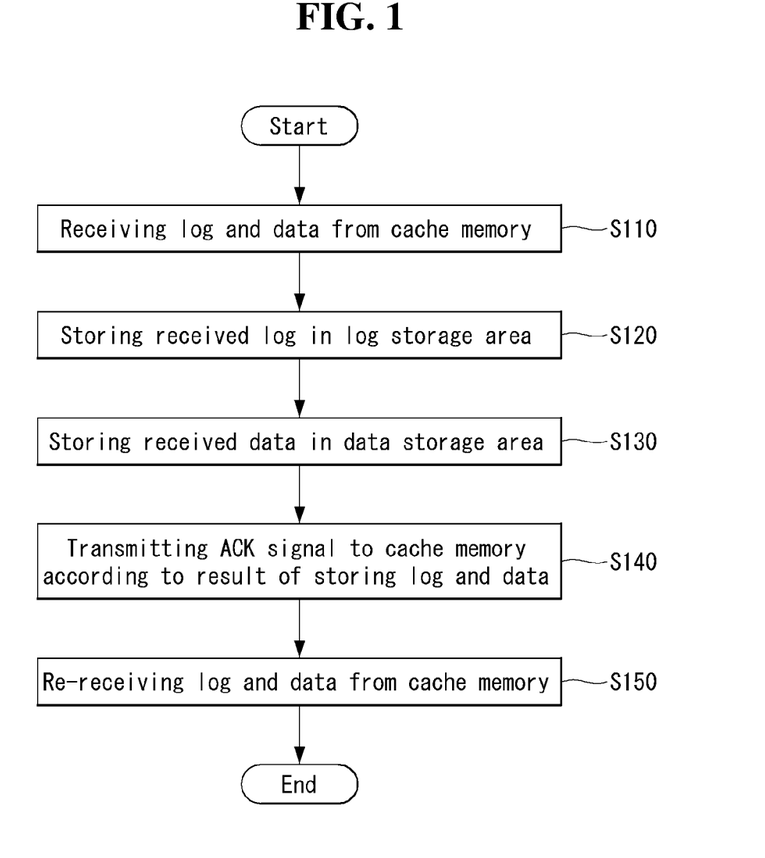
FIG. 1 is a diagram illustrating a method of operating a non-volatile memory device according to a first embodiment of the present disclosure.

FIG. 1 is a diagram illustrating a method of operating a non-volatile memory device according to a first embodiment of the present disclosure.

Referring to FIG. 1, a method of operating a non-volatile memory device 100 according to a first embodiment of the present disclosure may include receiving a log and data from a cache memory 200 (S110), storing the received log in a log storage area 110 (S120), storing the received data in a data storage area 120 (S130) and transmitting an ACK signal to the cache memory 200 (or processor 300) according to a result of storing the log and the data (S140).

The receiving the log and data from the cache memory 200 may be receiving simultaneously the log and the data from the cache memory 200. In this case, the log may include a command. As described above, by simultaneously transmitting and receiving the log and the data, it may occur that an effect of reducing the amount of data transmitted and received between the cache memory 200 and the non-volatile memory device 100.

In addition, since the log and the data may be transmitted and received simultaneously, the receiving a log and data from a cache memory 200 (S110) and the storing the received log in the log storage area 110 (S120) may be performed simultaneously and are not bound to the order.

In this case, the log storage area 110 or the data storage area 120 may mean a plurality of memory cells included in the non-volatile memory. The log storage area 110 may mean a memory cell allocated to store a log among the plurality of memory cells.

According to the result of storing the log and the data, the transmitting the ACK signal to the cache memory 200 (or processor 300) (S140) may be transmitting a flag bit from the log storage area 110 and the data storage area 120 to an ACK generation unit 140, and transmitting the ACK signal from the ACK generation unit 140 to the cache memory 200 (or processor 300) based on the flag bit 130.

In this case, the ACK signal may include a first ACK signal indicating that operation of the non-volatile memory device 100 is completed or a second ACK signal requesting retransmission of the log and the data to the cache memory 200. That the operation of the non-volatile memory device 100 is completed may mean that storing the log and the data has been successfully completed, or that retransmission of the log and the data from the cache memory 200 is not required because modification is possible.

In this way, in order to transmit the first or second ACK signal, it is necessary to check the result of storing the log and the result of storing the data. To this end, the flag bit 130 may be transmitted from the log storage area 110 in which the log is stored and the data storage area 120 in which the data is stored to the ACK generation unit 140. The ACK generation unit 140 may generate the ACK signal based on the flag bit 130 and select whether to transmit the ACK signal to the cache memory 200.

At this time, the flag bit 130 may include a first flag bit indicating success or failure of storing the log in the log storage area 110 and a second flag bit indicating success or failure of storing the data in the data storage area 120. Here, the bit may mean a bit of 0 or 1.

For example, when the first flag bit is 1, it may mean that the storing of the log in the log storage area 110 is successful, and when the first flag bit is 0, it may mean that the storing of the log in the log storage area 110 has failed.

For example, when the second flag bit is 1, it may mean that the storing of the data in the data storage area 120 is successful, and when the first flag bit is 0, it may mean that the storing of the data in the data storage area 120 has failed.

Accordingly, the flag bit 130 may be formed of four combinations of 11, 10, 01, and 00, which will be described in detail in FIG. 2 below.

Figure 2:
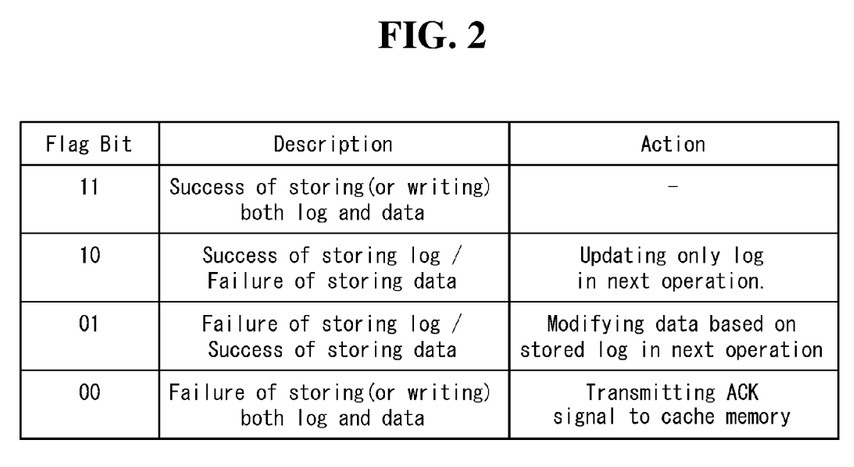
FIG. 2 is a table of flag bits according to a first embodiment of the present disclosure.

FIG. 2 is a table of flag bits according to a first embodiment of the present disclosure.

According to FIG. 2, the flag bit 130 may be formed of four combinations of 11, 10, 01, and 00. In this case, among the two numbers forming the flag bit 130, the left number may be referred to as the first flag bit, and the right number may be referred to as the second flag bit.

When the flag bit 130 is 11, it may be seen that the log is successfully stored in the log storage area 110, and the data is successfully stored in the data storage area 120. In this case, no separate follow-up action is required, and the next log and data may be received from the cache memory 200.

When the flag bit 130 is 10, it may be seen that the log is successfully stored in the log storage area 110, but it may be seen that the data cannot be stored in the data storage area 120 or that an error has occurred in the storage process. In this case, since a problem has occurred only in the log and the data has been well stored, only the log may be updated in the next operation.

That is, since the method of operating the non-volatile memory device 100 according to the present disclosure is for accurate and consistent storage of the data, if the problem occurs only in the log, it may be solved by updating only the log.

When the flag bit 130 is 01, it may be seen that the log cannot be stored in the log storage area 110 or an error has occurred in the storage process, and it may be seen that the data is successfully stored in the data storage area 120. In this case, since the log has been stored well, but a problem has occurred in the data, the data may be modified based on the stored log in the next operation.

That is, if the log has been accurately stored, the data may be newly stored or modified based on the log. This is because the log is a record of the computer's processing over time and a command that includes the address of data, etc.

When the flag bit 130 is 00, it can be seen that storing of both log and data has failed. That the storing has failed may mean that it cannot be stored in the allocated storage area or that an error has occurred in the storage process. In this case, since a problem has occurred in both the log and data, the second ACK signal is transmitted to the cache memory 200 (or the processor 300), and the same log and data may be retransmitted from the cache memory 200.

At this time, the cache memory 200 may temporarily store the log and the data in preparation for the second ACK signal. That is, after the log and data are transmitted from the cache memory 200 to the log storage area 110 and the data storage area 120, the cache memory 200 may temporarily store the transmitted log and data without deleting them. Later, when the first ACK signal is transmitted to the cache memory 200, the cache memory 200 may delete the transmitted log and data after checking the first ACK signal.

When receiving the second ACK signal, the cache memory 200 may retransmit the transmitted log and data. That is, the log storage area 110 and the data storage area 120 may re-receive the log and the data from the cache memory 200.

Figure 3:
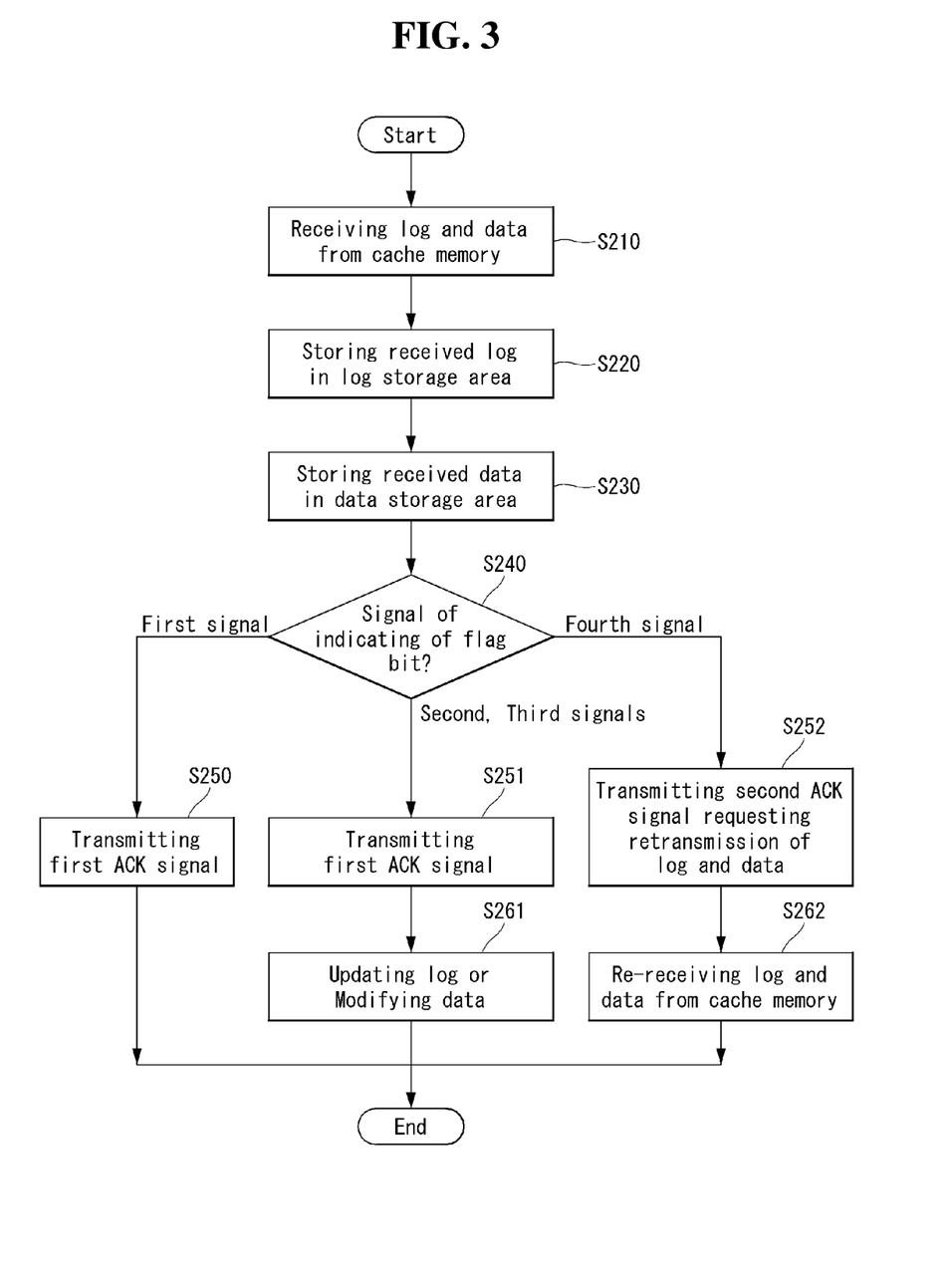
FIG. 3 is a diagram illustrating a method of operating a non-volatile memory device according to a flag bit according to a first embodiment of the present disclosure.

FIG. 3 is a diagram illustrating a method of operating a non-volatile memory device according to a flag bit according to a first embodiment of the present disclosure.

Referring to FIG. 3, a method of operating a non-volatile memory device 100 according to a first embodiment of the present disclosure may include receiving a log and data from a cache memory 200 (S210), storing the received log in a log storage area 110 (S220), and storing the received data in a data storage area 120 (S230).

In addition, the method of operating a non-volatile memory device 100 according to a first embodiment of the present disclosure may further include, when the storing the log and the data is completed with success or failure, a flag bit 130 indicating this as a bit is stored in a memory cell, transmitting the corresponding flag bit 130 to an ACK generation unit 140 (S240).

At this time, the flag bit 130 may be any one of a first signal indicating success of storing the log and the data, a second signal indicating success of storing the log and failure of storing the data, a third signal indicating failure of storing the log and success of storing the data, and a fourth signal indicating failure of storing the log and the data.

That is, the first to fourth signals may be combinations of a first flag bit and a second flag bit. Accordingly, the first signal may be 11, the second signal may be 10, the third signal may be 01, and the fourth signal may be 00.

When the flag bit 130 is the first signal to the third signal, the non-volatile memory device 100 may transmit a first ACK signal to a processor 300 (S250 and S251).

When the flag bit 130 is the first signal, the operation of the non-volatile memory device 100 may be completed, and reception of the next log and data may be started.

When the flag bit 130 is the second signal and the third signal, the first ACK signal may be transmitted to the processor 300 (S251), and the log may be updated or the data may be modified based on the log (S261).

When the flag bit 130 is the fourth signal, a second ACK signal requesting retransmission of the log and the data may be transmitted to the cache memory 200 (S252). In this case, the log and the data may be re-received from the cache memory 200 (S262).

Figure 4:
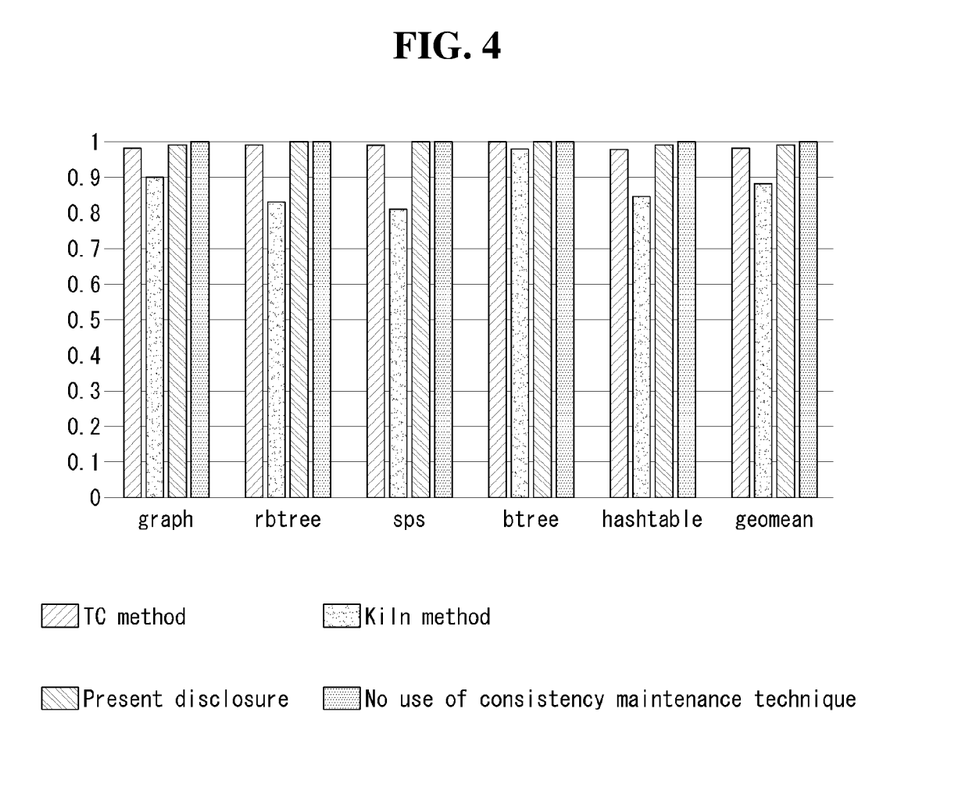
FIG. 4 is a graph comparing system performance when a method of operating a non-volatile memory device according to a first embodiment of the present disclosure is implemented.

FIG. 4 is a graph comparing system performance when a method of operating a non-volatile memory device according to a first embodiment of the present disclosure is implemented.

According to FIG. 4, four types of graphs are shown. Graphs using the conventional TC method, the Kiln method, and the operation method of the present disclosure are shown, as well as a graph is also shown when no consistency maintenance technique is used.

According to FIG. 4, in order to compare the system performance, a bar graph is shown based on four items. From the left, they are graph, rbtree, sps, btree, hashtable, and geomean, and the illustrated bar graph shows performance values according to each method as a value between 0 and 1.

When the consistency maintenance technique is not used, the graph has a value of 1. In the case where the consistency maintenance technique is not used, the closer the size to the graph, the better the system performance. That is, although the TC method, the Kiln method, and the logic of the operation method of the present disclosure have been added, it is a good idea to keep it as close as possible to the original system speed.

According to FIG. 4, it can be seen that the graphs are displayed closer to 1 when the operation method of the present disclosure is used than the TC method and the Kiln method for all four items. Accordingly, it can be seen that the system performance is superior to the conventional methods when using the operation method of the present disclosure. Specifically, it can be seen that when the operation method according to the present disclosure is used, an average of 1.2% compared to the TC method and an average of 15.6% compared to Kiln are improved.

Figure 5:
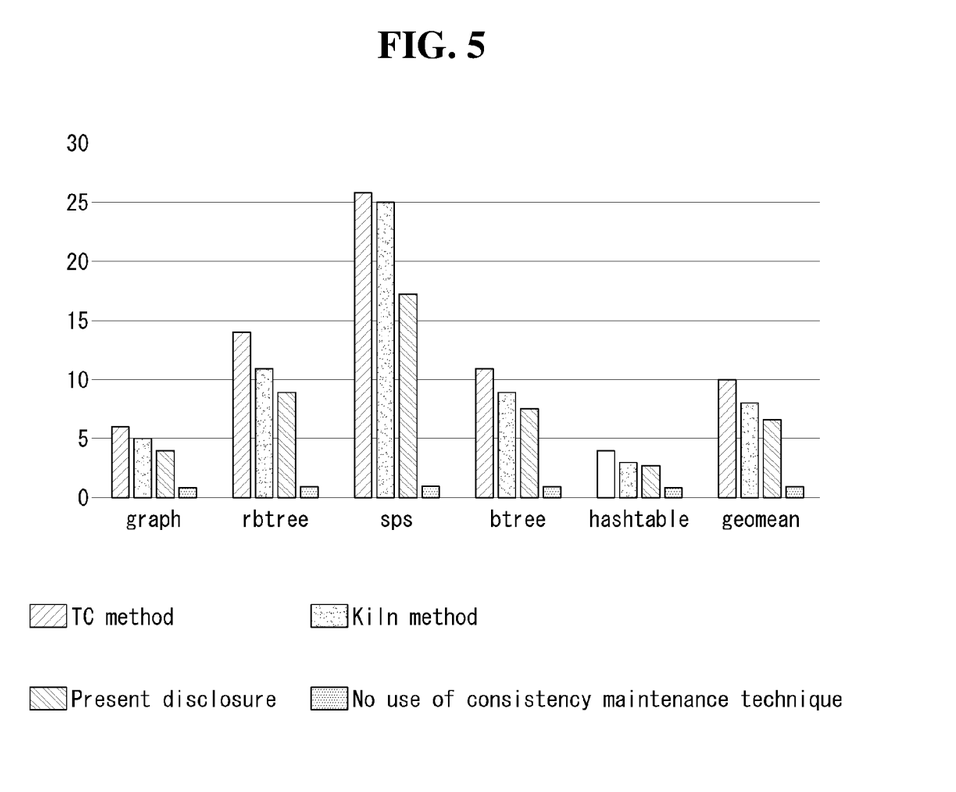
FIG. 5 is a graph comparing an amount of bus transactions when a method of operating a non-volatile memory device according to a first embodiment of the present disclosure is implemented.

FIG. 5 is a graph comparing an amount of bus transactions when a method of operating a non-volatile memory device according to a first embodiment of the present disclosure is implemented.

According to FIG. 5, four types of graphs are shown. Graphs using the conventional TC method, the Kiln method, and the operation method of the present disclosure are shown, as well as a graph is also shown when no consistency maintenance technique is used.

According to FIG. 5, in order to compare the system performance, a bar graph is shown based on four items. From the left, they are graph, rbtree, sps, btree, hashtable, and geomean, and the illustrated bar graph shows the amount of bus transactions according to each method as a value between 0 and 30.

It can be seen that the case where the consistency maintenance technique is not used has the lowest amount of bus transaction. In this case, it can be seen that the bar graph when the operation method according to the present disclosure is used has a lower height than the bar graph when other conventional methods are used. Specifically, looking at the amount of bus transactions in the case of using the operation method according to the present disclosure, it can be seen that an average of 32.8% compared to the TC method and an average of 14.5% compared to the Kiln method are decreased.

Hereinafter, a non-volatile memory device 100 according to a second preferred embodiment of the present disclosure will be described in detail based on the above-described contents.

In addition, in the description of the non-volatile memory device 100 according to the second preferred embodiment of the present disclosure, the same as or overlapping with those described in the first embodiment described above are omitted, and different points are mainly described.

Figure 6:
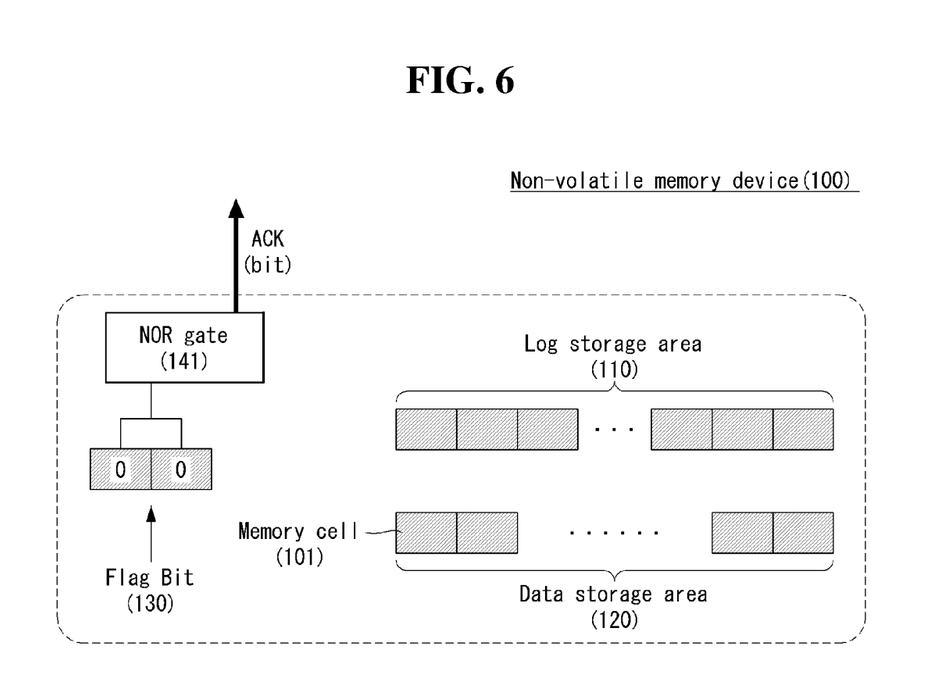
FIG. 6 is a diagram illustrating a non-volatile memory device according to a second embodiment of the present disclosure.

FIG. 6 is a diagram illustrating a non-volatile memory device according to a second embodiment of the present disclosure.

Referring to FIG. 6, the non-volatile memory device 100 may include a log storage area 110, a data storage area 120, and a NOR gate 141. In this case, the log storage area 110 and the data storage area 120 may mean a plurality of memory cells.

The non-volatile memory device 100 may include a plurality of memory banks including the plurality of memory cells, and the plurality of memory banks may include the log storage area 110 for each memory bank. That is, the log storage area 110 may mean a plurality of memory cells that are separately allocated for storing the log for each memory bank.

The flag bit 130 may include a first flag bit and a second flag bit. That is, the flag bit 130 may be a concept including two memory cells. According to FIG. 6, the flag bit 130 is illustrated as 00, but is not limited thereto. The flag bit 130 may include 11, 10, 01, and 00, and the contents thereof are the same as or overlapping with those described in the first embodiment, and thus are omitted.

The NOR gate 141 may mean the ACK generation unit 140. That is, the ACK generation unit 140 may include the NOR gate 141. The flag bit 130 may pass through the NOR gate 141 and be converted into a 1-bit ACK signal. That is, the ACK generation unit 140 may generate the 1-bit ACK signal based on the flag bit 130.

According to FIG. 6, the log storage area 110 may store a log received from the cache memory 200, and the data storage area 120 may store data received from the cache memory 200. In addition, the ACK generation unit 140 may receive the flag bit 130 from the log storage area 110 and the data storage area 120, and the ACK signal may be transmitted to the cache memory 200 (or the processor 300) according to the flag bit 130.

At this time, the log storage area 110 and the data storage area 120 may simultaneously receive the log and data from the cache memory 200.

In addition, the flag bit 130 may be any one of a first signal indicating success of storing the log and the data, a second signal indicating success of storing the log and failure of storing the data, a third signal indicating failure of storing the log and success of storing the data, and a fourth signal indicating failure of storing the log and the data.

For example, the first signal may be 11, the second signal may be 10, the third signal may be 01, and the fourth signal may be 00.

For example, when the flag bit 130 is the fourth signal, the ACK generation unit 140 may receive the fourth signal, and the ACK generation unit 140 may transmit the ACK signal to the cache memory 200. The ACK signal may include a first ACK signal and a second ACK signal, and when the flag bit 130 is the fourth signal, the ACK generation unit 140 may transmit the second ACK signal. Descriptions of the first ACK signal and the second ACK signal are the same as or overlapping with those described in the first embodiment, and thus are omitted.

Hereinafter, a computing system including the non-volatile memory device 100 according to a third preferred embodiment of the present disclosure will be described in detail based on the above-described contents.

In addition, in the description of the computing system according to the third preferred embodiment of the present disclosure, the same as or overlapping with description in the first embodiment and the second embodiment described above are omitted, and different points are mainly described.

Figure 7:
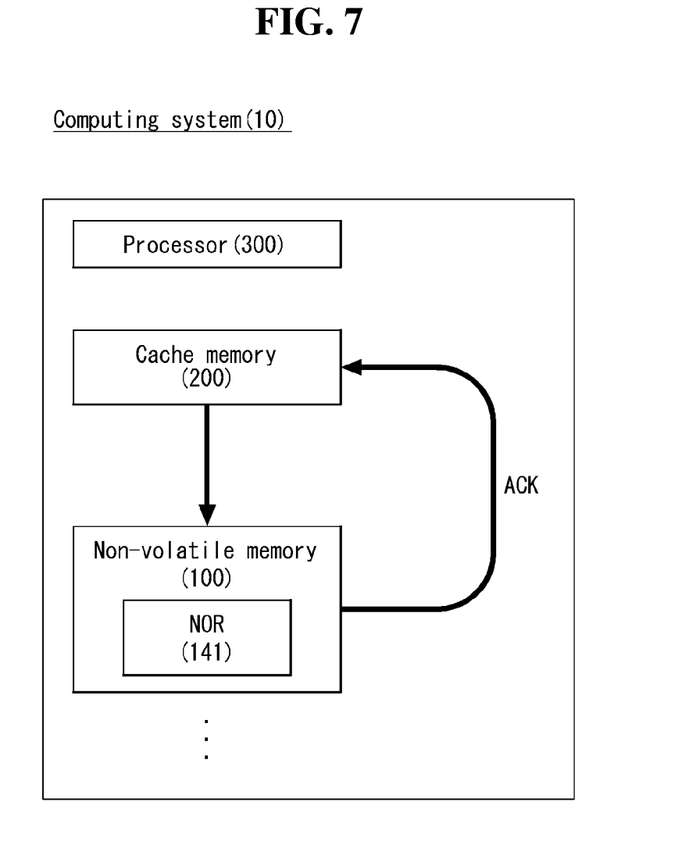
FIG. 7 is a diagram illustrating a computing system according to a third embodiment of the present disclosure.
Figure 8:
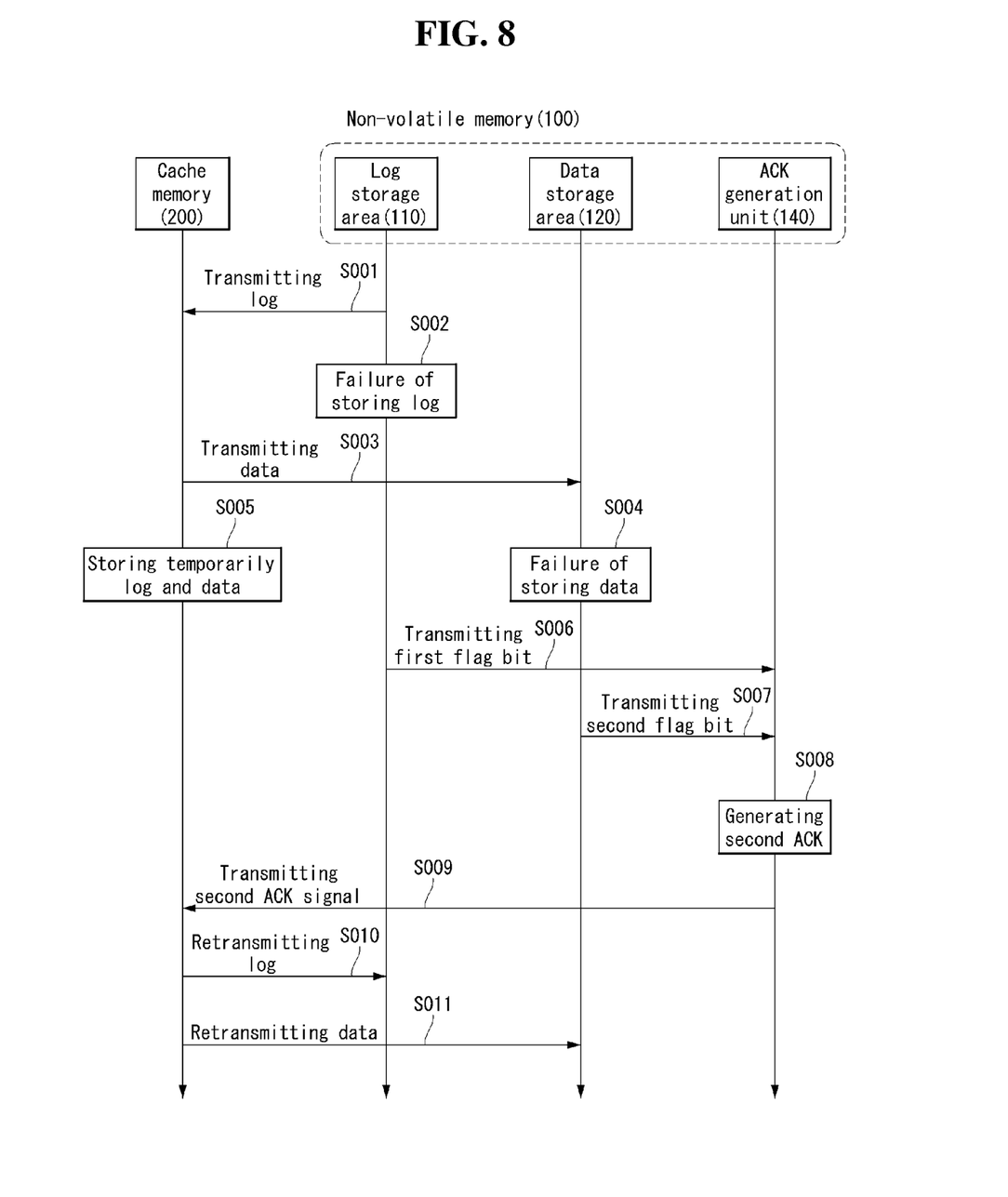
FIG. 8 is a diagram illustrating a case of generating a second ACK signal according to a third embodiment of the present disclosure.

FIG. 7 is a diagram illustrating a computing system according to a third embodiment of the present disclosure, and FIG. 8 is a diagram illustrating a case of generating a second ACK signal according to a third embodiment of the present disclosure.

According to FIG. 7, a computing system 10 may include a processor 300, a cache memory 200, and a non-volatile memory device 100. The non-volatile memory device 100 may further include a NOR gate 141, that is, an ACK generation unit 140 therein.

At this time, the non-volatile memory device 100 used may be the non-volatile memory device 100 according to the second embodiment described above, and the operation method may be the operation method according to the first embodiment described above.

At this time, the processor 300 is a component capable of performing an operation and controlling other devices. Mainly, it may mean a central processing unit (CPU), an application processor (AP), and the like. Also, the CPU or AP may include one or more cores therein, and the CPU or AP may operate using an operating voltage and a clock signal.

According to FIG. 7, the ACK signal generated from the ACK generation unit 140 may be transmitted to the cache memory 200. However, this is an example, the ACK signal generated from the ACK generation unit 140 may be transmitted to the processor 300, and the processor 300 may transmit a signal commanding whether to transmit a log and data to the cache memory 200 based on the ACK signal.

According to FIG. 8, a log may be transmitted from the cache memory 200 to the log storage area 110 (S001), and data may be transmitted from the cache memory 200 to the data storage area (S002). In this case, the log storage area 110 stores the log, and a result of storing the log may be success or failure (S002). In addition, the data storage area 120 stores the data, and a result of storing the data may be success or failure (S004). However, according to FIG. 8, a case where the result of storing the log and the result of storing the data are failure will be described below.

After the cache memory 200 transmits the log and data (S001, S003), it may temporarily store the transmitted log and data without deleting them immediately (S005). This may be to prepare for a case in which an ACK signal including a request for retransmission of the log and data is received from the ACK generation unit 140 in the future.

The log storage area 110 may transmit a first flag bit indicating whether the storing the log is success or failure to the ACK generation unit 140 (S006), and the data storage area 120 may transmit a second flag bit indicating whether the storing the data is success or failure to the ACK generation unit 140 (S007). When the storing both log and data is failure, the ACK generation unit 140 may generate a second ACK signal (S008) and transmit the generated second ACK signal to the cache memory 200 (S009). When receiving the second ACK signal, the cache memory 200 may retransmit the log and data stored temporarily (S010 and S011).

The above-described present disclosure can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g. transmission over the internet). Accordingly, the above detailed description should not be construed in all aspects as limiting, and be considered illustrative. The scope of the present disclosure should be determined by rational interpretation of the appended claims, and all changes within the equivalent range of the present disclosure are included in the scope of the present disclosure.

In addition, although the embodiments have been described above, these are only examples and do not limit the present disclosure, and those of ordinary skill in the art to which the present disclosure belongs will appreciate that various modifications and applications not illustrated above are possible without departing from the essential features of the present embodiment. For example, each component specifically shown in the embodiments can be modified and implemented. In addition, differences related to these modifications and applications should be construed as being included in the scope of the present disclosure defined in the appended claims.

What is claimed is:

1. A method of operating a non-volatile memory device including a log storage area, a data storage area, and an ACK generation unit, the method comprising:
   receiving a log and data from a cache memory;
   storing the received log in the log storage area;
   storing the received data in the data storage area; and
   transmitting an ACK signal to the cache memory according to a result of storing the log and the data,
   wherein the transmitting of the ACK signal is performed by the ACK generation unit including a NOR gate configured to receive a flag bit from the log storage area and the data storage area and generate the ACK signal based on the received flag bit.

2. The method of claim 1, wherein the receiving the log and data is receiving simultaneously the log and the data from the cache memory.

3. The method of claim 1, wherein the ACK signal includes:
   a first ACK signal indicating that operation of the non-volatile memory device is completed or
   a second ACK signal requesting retransmission of the log and the data to the cache memory.

4. The method of claim 1, wherein the transmitting the ACK signal is transmitting the flag bit from the log storage area and the data storage area to the ACK generation unit, and transmitting the ACK signal from the ACK generation unit to the cache memory based on the flag bit.

5. The method of claim 4, wherein the flag bit includes:
a first flag bit indicating success or failure of storing the log in the log storage area; and
a second flag bit indicating success or failure of storing the data in the data storage area.

6. The method of claim 4, wherein the flag bit is any one of a first signal indicating success of storing the log and the data, a second signal indicating success of storing the log and failure of storing the data, a third signal indicating failure of storing the log and success of storing the data, and a fourth signal indicating failure of storing the log and the data.

7. The method of claim 6, wherein the transmitting the ACK signal is transmitting the ACK signal from the ACK generation unit to the cache memory when the fourth signal is transmitted from the log storage area and the data storage area to the ACK generation unit.

8. The method of claim 7, wherein the ACK signal includes a command to retransmit the log and the data.

9. A non-volatile memory device, comprising:
a log storage area configured to store a log received from a cache memory;
a data storage area configured to store data received from the cache memory; and
an ACK generation unit including a NOR gate and configured to receive a flag bit from the log storage area and the data storage area and transmit an ACK signal to the cache memory according to the flag bit.

10. The non-volatile memory device of claim 9, wherein the log storage area and the data storage area receive simultaneously the log and the data from the cache memory.

11. The non-volatile memory device of claim 9, wherein the flag bit includes:
a first flag bit indicating success or failure of storing the log in the log storage area; and
a second flag bit indicating success or failure of storing the data in the data storage area.

12. The non-volatile memory device of claim 9, wherein the flag bit is any one of a first signal indicating success of storing the log and the data, a second signal indicating success of storing the log and failure of storing the data, a third signal indicating failure of storing the log and success of storing the data, and a fourth signal indicating failure of storing the log and the data.

13. The non-volatile memory device of claim 12, wherein the flag bit is the fourth signal,
the ACK generation unit receives the fourth signal, and
the ACK generation unit transmits the ACK signal to the cache memory.

14. The non-volatile memory device of claim 13, wherein the ACK signal includes a command to retransmit the log to the log storage area, and retransmit the data to the data storage area.

15. The non-volatile memory device of claim 9, wherein the non-volatile memory device includes a plurality of memory banks including a plurality of memory cells, and the plurality of memory banks include the log storage area for each memory bank.

16. A computing system, comprising:
a non-volatile memory device of claim 9; and
a cache memory configured to transmit a log and data to the non-volatile memory device.

17. The computing system of claim 16, wherein after transmitting the log and data, the cache memory temporarily stores the transmitted log and data.

18. The computing system of claim 17, wherein the cache memory receives an ACK signal from the non-volatile memory device, and retransmits the temporarily stored log and data to the non-volatile memory device based on the ACK signal.

* * * * *